United States Patent [19]

Snaper

[11] Patent Number: 4,837,568
[45] Date of Patent: Jun. 6, 1989

[54] REMOTE ACCESS PERSONNEL IDENTIFICATION AND TRACKING SYSTEM

[76] Inventor: Alvin A. Snaper, 2800 Cameo Cir., La Vegas, Nev. 89107

[21] Appl. No.: 70,993

[22] Filed: Jul. 8, 1987

[51] Int. Cl.$^4$ ............... H04Q 7/00; G08B 13/00
[52] U.S. Cl. ............... 340/825.540; 455/613; 340/572; 340/825.490
[58] Field of Search ............... 382/2, 59; 235/380; 340/825.31, 825.32, 825.49, 825.54, 825.72, 572, 573, 540, 541, 505; 455/603, 605, 607, 613

[56] References Cited

U.S. PATENT DOCUMENTS

| | | | |
|---|---|---|---|
| 3,641,316 | 2/1972 | Dethloff et al. | |
| 4,213,119 | 7/1980 | Ward et al. | 340/870.02 |
| 4,275,385 | 6/1981 | White | 340/825.49 |
| 4,418,411 | 11/1983 | Strietzel | 340/825.34 |
| 4,471,345 | 9/1984 | Barrett, Jr. | 340/825.32 |
| 4,636,950 | 1/1987 | Caswell et al. | 340/825.49 |
| 4,649,385 | 3/1987 | Aires et al. | 340/825.49 |
| 4,656,463 | 4/1987 | Anders et al. | 340/825.54 |
| 4,742,573 | 5/1988 | Popovic | 340/825.54 |

Primary Examiner—2
Assistant Examiner—Donald J. Yusko
Attorney, Agent, or Firm—Donald D. Mon

[57] ABSTRACT

A remote access personnel identification system for tracking personnel in, or controlling access to a secured area in which an identification module includes a microcomputer chip is programmed with identifying information. The identification module is worn by personnel for interrogation by a remote field reading unit and includes a transmitter and receiver for two-way transfer of information to the portable hand held field reading unit. The system includes a central processing station in a master control center for programming each idenfication module with specific information regarding the personnel having access to the secured area. Information such as name, identification number, social security number, and descriptive characteristics are programmed into the module. The remote field reader unit allows the identification module to be interrogated at anytime, anywhere with a secured area. A security guard simply points and triggers a handgun to send an infra-red signal to interrogate the module. If identifying information is mis-matched during the interrogation an alarm is sounded to alert the security guard. Additionally the field reading unit records each interrogation storing information about personnel movement within the secured area.

8 Claims, 3 Drawing Sheets

REMOTE ACCESS PERSONNEL IDENTIFICATION AND TRACKING SYSTEM

FIELD OF THE INVENTION

This invention relates to personnel security system and more particularly relates to a personnel identification system which can remotely interrogate, identify; and verify personnel having access to secured areas.

BACKGROUND OF THE INVENTION

Present methods of identification restrict entry by securing areas from access except by personnel with proper identification or who know certain procedures by which access is gained. These systems include locked doors opened by entering a predetermined code through a keyboard or inserting a magnetic card into a card reader. The difficulty with those systems is that once access is gained through knowledge of code or a false ID card there is no reliable way to determine the presence of unauthorized personnel (i.e. once the entry security is breached the unauthorized entry is difficult to detect.)

Identification badges worn by all personnel having access to a secured area help but are too slow and unreliable for the demanding needs of securing highly sensitive and restricted areas deep inside a base from unauthorized entry. Identification badges are effective for only a small number of people who repeatedly pass a security guard who can be trusted to confirm personal identification. This may not protect against the use of forged ID badges unless the guard knows each entrant personally.

More sophisticated methods such as "magnetic strips" or "optically coded" ID cards are considerably faster and more reliable. They provide a high degree of automation and confidence in card reading and detection but also provide little confidence in identification of the card holder. Such cards are not only susceptible to counterfeiting but are particularly vulnerable to theft. In addition, the card access systems are not specifically suited to the identification of large numbers of people flowing through a single point of entry.

Unauthorized access deep within a base presents a severe problem much broader in scope than just the problem of breaks in security. In these times when acts of sabotage, espionage or terrorism can result in destruction of billions of dollars worth of equipment, kill large numbers of a concentration of troops or seriously threaten national security, extraordinary solutions to security problems are needed.

It is therefore an object of the present invention to provide a remote access personnel identification system for prevention against unauthorized access inside secured areas.

Another object of the present invention is to provide personnel identification modules carried by personnel prior to as well as after access to a secured area which can be interrogated remotely.

Yet another object of the present invention is to provide a security system which has personnel identification modules which store unique personal information for verifying true identity at anytime within a secured area.

Still another object is to provide a security system having a control processing system for programming personnel modules and processing entry and departure data from all personnel.

Another object of the security system is to reliably identify large numbers of personnel flowing to and from areas deep inside a secured area.

BRIEF DESCRIPTION OF THE INVENTION

This invention provides a personnel identification system which is fast, reliable, secure and easy to update in real time. This system includes an intelligent personnel identification (PID) module, a hand portable remote interrogation unit and a central micro-processor station. The personnel identification modules are a fully potted circuit board containing a single micro-chip computer, membrane switches and an infra-red (IR) transponder. The system is powered by a long life lithium battery. The micro-computer and the personnel identification module provides the intelligence for identification data storage, module activation and IR communication and automatic deactivation.

When the identification module is initially programmed information is input from interviews with an applicant. An operator enters personnel identification data by means of a computer processing system (CPS) terminal. The CPS programs the module using standard programmable read only memory (PROM) programming techniques. The information put into the identification module is therefore non-volatile. Further, the data entered into the module is unique to the person to which it is assigned, once it has been fully programmed.

Coded identification of the module provides a means for the single chip micro-computer to test the true identity of the user. Initial activation is accomplished by pressing a hidden membrane switch on the module to enter codes.

The authorized user of a PID can enter a verification code which activates the PID and makes it responsive to the infra-red interrogation signal. Without this secure activation a PID is inert and will not respond to remote interrogation. Alternately, the user has the option of inserting another code which would indicate covertly to the interrogator that he is in a distress or hostage situation. An improper code entry on the PID module would also be detected by the interrogator. Once the single chip micro-computer is active a number of additional techniques exist for verification of the module. Some of the techniques include voice recognition, fingerprint correlation, a personnel identification number entry, sequential switch closure and device orientation. Voice and fingerprint tests may me used but are less desirable because they would tend to drive the cost of the identification module to unacceptable limits.

The hand portable remote interrogation unit is a field reader device having a portable micro-computer with a membrane switch keyboard, an alpha numeric liquid crystal display (LCD), a data storage device, an IR transceiver hand gun and a battery pack. The unit includes a real time clock for time tagging all recorded data.

In a typical application deep within a secured area a security guard will carry the interrogation unit to his assigned position or patrol area. As oncoming personnel approach his station he would use the IR transceiver and his field reader to selectively interrogate each identification module by activating a trigger mechanism. The identification module would be worn by a user and be activated by the reader unit. A successful data transfer to the remote reader would be followed by an audible tone The identification data received on each interrogation is displayed on the LCD display and recorded on cassette tape or other storage means.

If the identification module has been improperly activated, the micro-computer in the module assures that the employee access code and the identification number entered by the user will not match. When a module is interrogated by the field reader these two numbers are immediately compared by the reader and an inequality reads out and an intrusion alarm is directed at the security guard. When a security guard reads an improperly activated identification module the field reader will generate an audible series of tones and flash an alarm lamp on the reader.

The central processing station includes an office microprocessor, a cathode ray tube (CRT) terminal, a cassette interface unit and a PROM programmer. The central processing system has two basic functions. The CPS is used as a station for identification module assignment and programming. After interviewing an employee for assignment the operator enters identification data into the terminal. After verification of all the data a blank identification module will be programmed by the unit. If desired this system can also include equipment to store a photographic image of the applicant in the central processing system data base. Once programmed and initialized the identification module is given to an applicant along with special instructions for activating the module.

A second function of the CPS system is data base management for purposes of tracking personnel movement. The field reader data storage media are processed to generate the data base. This provides time tagged entry and departure records which are automatically maintained for all personnel. With this data the CPS can generate various reports regarding manpower location and individual times on/off site and absenteeism.

Identification module interrogation is achieved by a free space, IR data link established between the hand held field reader transceiver and the identification module transponder. The interrogation occurs in a two-way IR communication using infra-red light emitting diodes as transmitters on both ends of the data link. Preferably the IR radiation is low level, non-coherent and totally eye safe to avoid any eye damage or government regulation. The radiation is directional and selective and provides a covert link difficult to intercept by unauthorized personnel.

The two-way communication technique is a pulse infra-red operating at a selected data rate in which interrogation is initiated by the field reader transceiver generating a continuous synchronization pulse stream. The interrogation module monitors the synchronization pulse stream until interrogation is confirmed, and then transmits a synchronized response. Once synchronization is established the field reader strobes the data base in the identification module on a strobe for bit basis. The data in the identification module is stored in thirty two bytes which can be transferred from the module to the reader in less than 1/10 of a second. Several different error detection and rejection techniques are used to assure that data is accurately transmitted from the identification module to the field reader.

The field reader is similar to the interrogation unit disclosed in U.S. Pat. No. 4,213,119, issued July 15, 1980 incorporated herein by reference. The field reader is similar in that an IR link is used for interrogation and data transmission. However, the pulse characteristics of the present invention are different. The interrogation signal sent by the field reader is more than just an activation signal as in the above patent. Specific information is sent by the field reader which may be altered and/or added to by the identification module.

The above and other advantages and novel features of the invention will be more fully understood from the following detailed description and the accompanying drawings, in which:

DETAILED DESCRIPTION OF THE INVENTION

Figure 1:
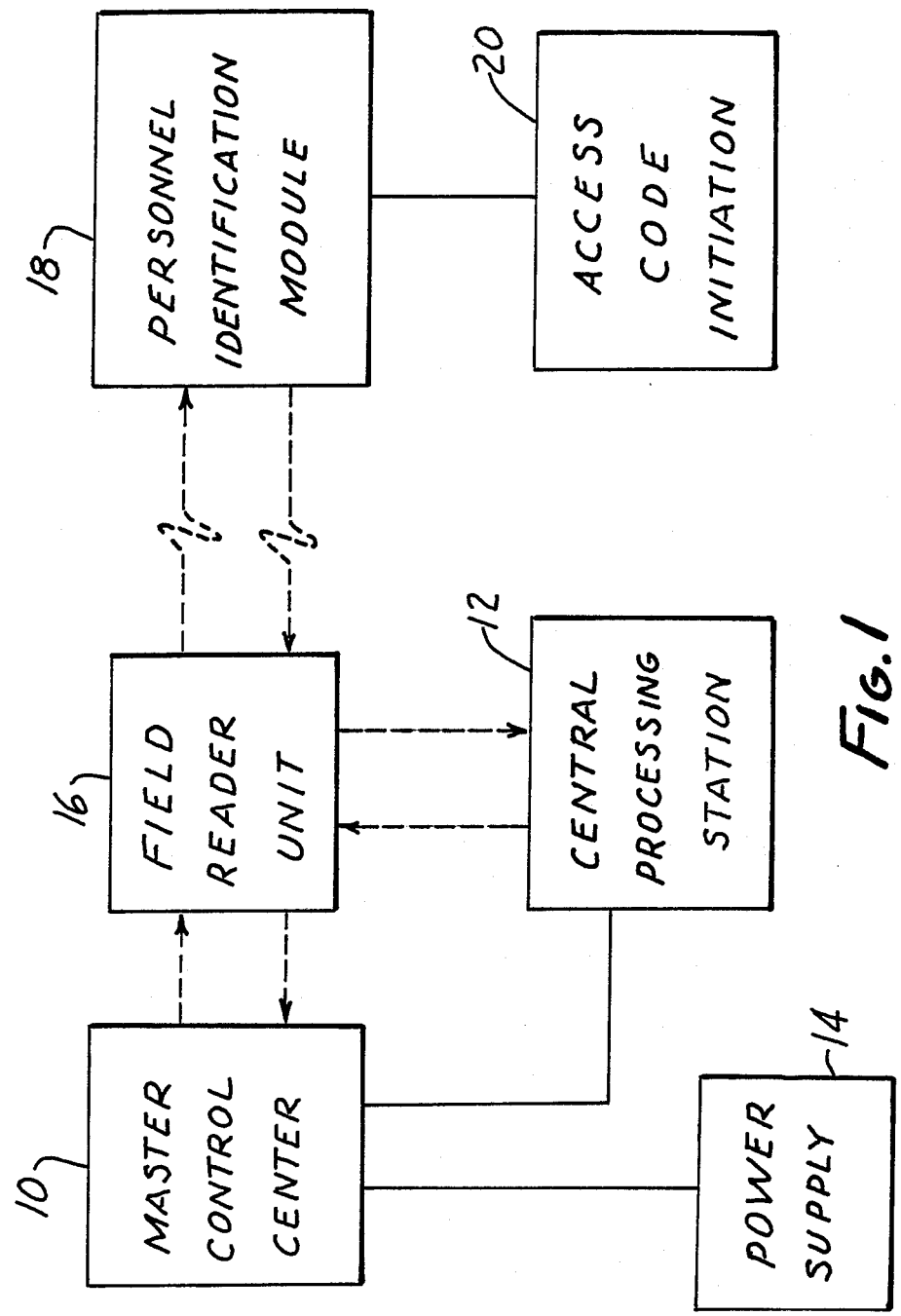
FIG. 1 is a block diagram of a remote access personnel identification system for tracking personnel inside a secured area.

An overall remote access personnel identification system for tracking personnel deep within a secured area as shown in the block diagram of FIG. 1. The system is comprised of a master control center 10 having a central processing station 12 and a power supply 14. The system will also include a portable remote field reading unit 16 which will transmit and receive information from personnel identification modules 18 which may be activated by an access code initiation device 20.

The Master control center 10 controls the transfer and storage of information between remote field reader unit 16 and central processing station 12. The system includes transfer and storage of data from the central processing system received when a personnel identification module is programmed. Information is also transferred to and from field reader unit. The central processing station will also include a display terminal for viewing information stored in the master control center or transferred from the field reader unit and a data storage device such as a large capacity hard disk. Identification data such as name, identification number, and classification, social security number, height, weight, age, hair color, sex, race, facial features, employee access code, and personnel identification number entered by the user may be stored in the system. In a more sophisticated approach a facial image corresponding to the identification module user may be stored and displayed on the monitor at the central processing station if desired. Display of facial images on a monitor for inspection by a security guard allows instant comparison of the image with the users actual appearance providing a high level of confidence in confirming personnel identification. While less desirable because of the added expense, low cost, off-the-shelf hardware for creating, storing and retrieving television images with personal computers renders this approach a viable alternative.

Figure 2:
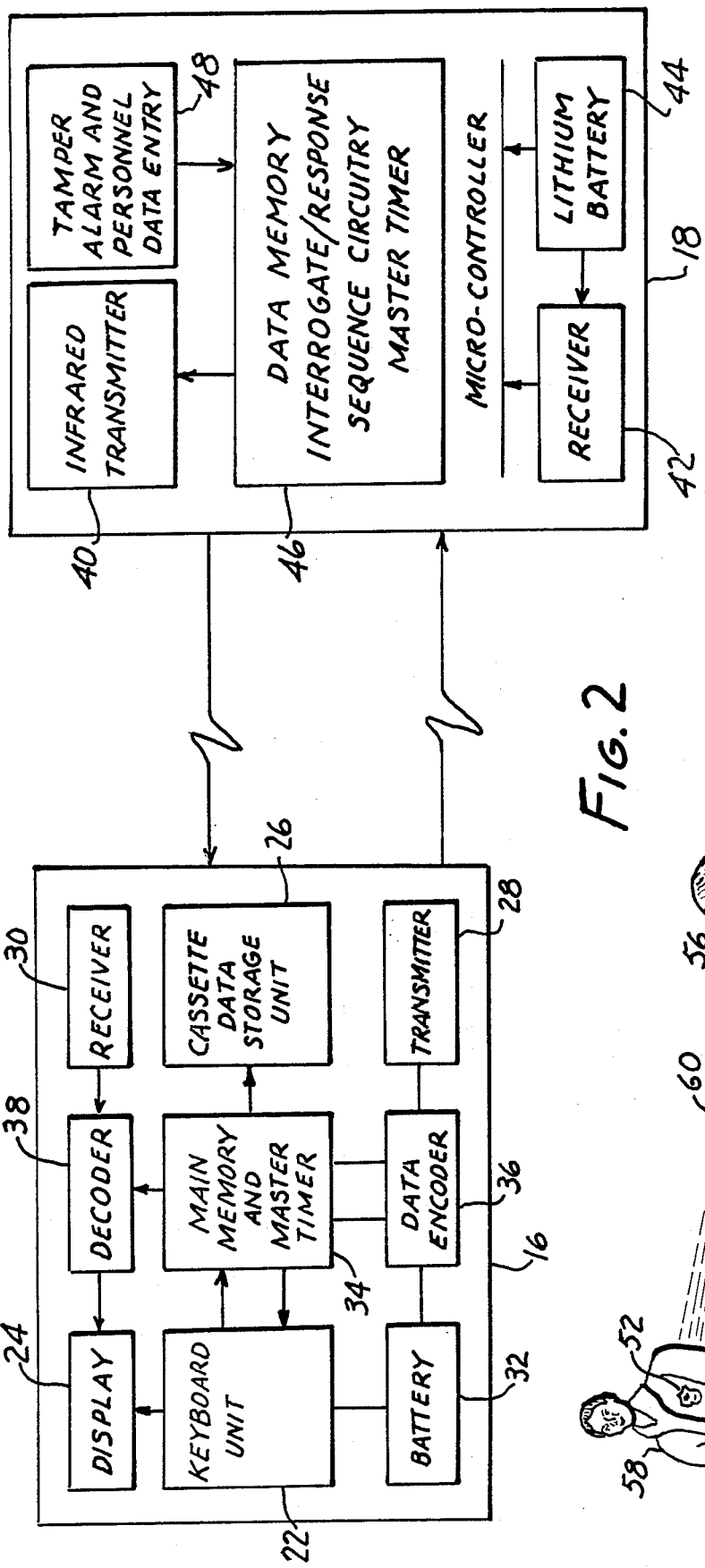
FIG. 2 is a block diagram of the field reader unit and an identification module.

The personnel identification module 18 and field reader unit 16 are shown in greater detail in the block diagram of FIG. 2 The remote interrogation or field reading unit is a portable micro-computer having membrane switch keyboard 22, and alpha numeric eight digit LCD display 24, cassette data storage unit 26, transmitter 28, receiver 30 and battery pack 32. A central processing unit integrated circuit 34 controls the functions of remote interrogation or field reading unit 16 to transfer data to and from transmitter 28 and receiver 30 as well as display 24. Digital data encoder 36 processes information from the main memory and master timer for transmission by transmitter 28. Digital decoder 38 processes information from receiver 30 and main memory and master timer 34 to be shown on LCD display 24. Information regarding personnel may also be input to field reader main memory and master timer 34 and LCD display 24 through keyboard unit 22.

Each personnel identification module is about the size of conventional identification card worn by the user. The identification module has a infra-red transmitter 40 and receiver 42 to transfer data to and from field reader unit 16. Identification module 18 is powered by lithium battery 44 which typically can have a life of 5 years or more. Personnel information is entered into micro-computer 46 in the module through a personnel data entry circuit 48. Micro-computer chip 46 such as a NEC D874B, provides data memory, interrogate/response pulses to or from infra-red transmitter 40 or receiver 42. Micro-computer 46 in the personnel module also provides sequence circuitry and a master timer for timing pulses received or transmitted.

Preferably data is stored in a thirty two byte block allocated to provide identification data. Such data as a name, identification number/classification, social security number, height, weight, age, hair color/sex/race, facial feature, employee access code, and identification module number entered by the holder may be stored in a thirty two byte block of data. Some or all of this data may be stored in a identification module for retrieval by the remote field reader unit.

The data is coded so that when identification module 18 is activated a main computer in master control center 10 can determine the true identity of a user. An interface into the central process station is provided by a tamper alarm in personnel data entry device 48. Improper entries will trigger an alarm. Additionally, initial activation of the identification module is accomplished by pressing a hidden membrane switch on the fully potted module. A timing circuit in the PID can control the length of time the card is validated and active. For example the circuit can require that the proper ID or verification number must be entered every four, eight or twenty-four hours in order to maintain the PID card or badge validity. Once identification module 18 is programmed and activated any or all of the thirty two bytes allocated for identification information can be used to verify identification. Additionally, techniques for identification can also include voice recognition, fingerprint correlation, sequential switch closure and device orientation. The voice and fingerprint test though feasible are not preferred because they would tend to drive the cost of the module to unacceptable levels.

Figure 3:
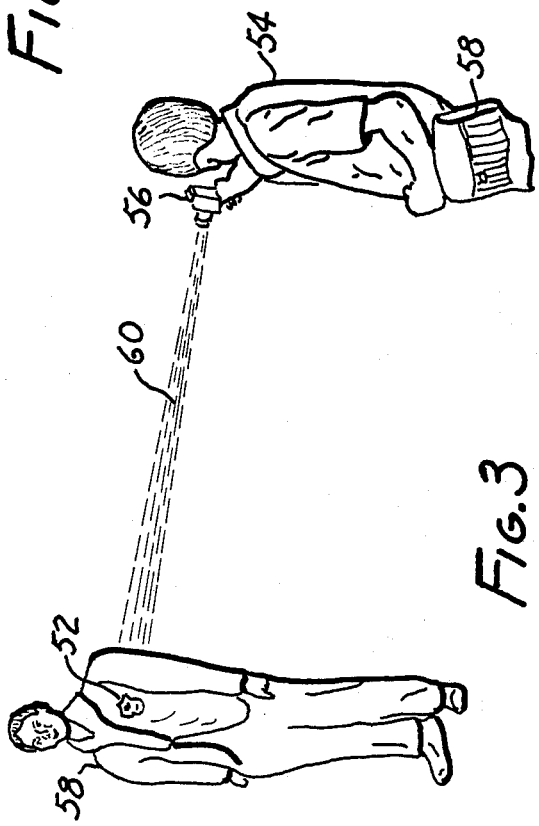
FIG. 3 illustrates operation of the remote access personnel identification system.

Use of the system to identify personnel deep within a secured area is illustrated in FIG. 3. A user 50 will have a identification module 52 worn externally somewhere on his clothing. A security guard 54 either at a guard station or roving in the secured area will have the remote field reader comprised of a transceiver handgun 56 and electronics pack 58 which will contain the data storage unit and a battery pack. The storage unit in the pack 58 will be a digital storage unit, such as a cassette or a disk system. The security guard will point the IR transceiver hand gun toward the identification module worn by personnel.

In a typical application deep within a secured area, the security guard 54 will carry remote field reader 16 to his assigned position or area of patrol. As oncoming personnel 50 approach his area he would use his IR transceiver 56 to selectively interrogate identification module 52 by pulling a trigger mechanism on IR transceiver 56. A series of coded pulses in transmission 60 will activate the transmitter in identification module 52 causing information to be transmitted to transceiver 56 for storage in a data storage unit such as a cassette in pack 58. When the identification module is interrogated by field reader 56 it will determine whether identification module 52 has been improperly activated. If identification module 52 has been improperly activated an inequality will result which will be detected by the remote field reader. This will cause an intrusion alarm to be generated by pack 58 alerting the security guard. Therefore, when a security guard reads the improperly activated module an audible series of tones and a flashing alarm lamp activated on the remote reader unit occurs.

At the end of the security guards shift the remote reader is transported to the master control center and information regarding all personnel movement recorded in the cassette data storage unit 26 is transferred to the master control center for storage. This will provide time and date stamping for recording movement of all personnel in the secured area over a period of time.

The communication technique between IR transceiver 56 and the identification module 52 is a two-way pulse infra-red operating at a data rate of approximately 10,000 bits per second. Interrogation is initiated by security guard 54 pulling the trigger on the transceiver handgun 56 to generate a continuous synchronization pulse stream 60. Identification module 52 monitors the synchronization pulses until interrogation is confirmed and then transmits synchronization response to the remote reader unit. Once synchronization is established the field reader unit strobes the data base from the identification module on a strobe per bit basis. This technique allows thirty two bytes of data in identification module 52 to be transmitted from the module to the remote reader in less than 1/10 of a second. A combination of five different error detection and rejection techniques may be utilized to be sure that accurate data is transmitted to the remote reader unit. These error detection and rejection techniques may be:

1. Failure of the user to properly activate his PID card.
2. Distress or hostage code activated by PID card holder.
3. Failure of PID information to match data base information.
4. Data base indicates PID card has been cancelled or invalidated.
5. Card appears valid but facial image or descriptive characteristics from data base does not match PID card holder.

Thus, there has been disclosed a remote access personnel identification and tracking system for maintaining the integrity of a secured area for personnel deep within the area. This system allows accurate positive identification of personnel deep within a secured area which is fast, reliable, and easy to update.

This invention is not to be limited by the embodiments shown in the drawings and described in the description, which is given by way of example and not of limitation, but only in accordance with the scope of the appended claims.

I claim:

1. A personnel identification and security system comprising:
   a remote personnel identification module to be worn by personnel, said programmable personnel identification module comprising:
   means for storing identifying data in digital form;
   means for entering or changing said identification data in said storing means;
   means for transmitting said identifying data to a remote location for interrogation, processing and storage;
   portable interrogating means for remotely interrogating said personnel identification module, said portable interrogating means comprising:
   a portable hand-held infra-red transmitting and receiving means for transmitting data to or receiving data from said personnel identification module; said portable interrogating means being constructed to transmit data to said storing means in said personnel identification module to add to or update identification data stored in said personnel identification module;
   processing means for processing identifying data received from said personnel identification module, said processing means including alarm means for alerting security personnel when any errors received in identifying data are detected; and
   storage means for storing identifying data received;
   whereby personnel identification and movements may be processed and stored anywhere within a secured area.

2. The security system according to claim 1 in which said means for transmitting identifying data to a remote location comprises: a portable infra-red transponder.

3. The security system according to claim 1 in which said processing means includes:
   infra-red receiver means;
   decoder means for decoding identifying data received;
   display means for displaying received decoded identifying data.

4. The security system according to claim 3 in which said storage means for storing identifying data received comprises a cassette data storage incorporated into said portable interrogations means.

5. The security system according to claim 3 in which said portable interrogating means includes a keyboard for entering data directly into said portable interrogating means.

6. The security system according to claim 1 in which said means for entering or clearing data in said personnel identification module includes means for remotely or directly entering information into said personnel identification module; and remote entering means comprising a transmitter in said portable interrogation unit for transmitting data to said personnel identification module; said direct entering means comprising means for directly connecting said personnel identification module to a central processing system; said central processing system including means for storing and displaying identifying data.

7. The security system according to claim 6 in which identifying data is entered into a thirty two byte block said personnel identification module containing at least data representing name, identification number, classification, access code and physical characteristics.

8. The security system according to claim 6 in which said central processing system includes means for storing personnel data entered into said programmable personnel identification module; and means for transferring data received by said remote reading means whereby a database of all personnel and their movements in a secured area is created.

* * * * *